UNITED STATES PATENT OFFICE.

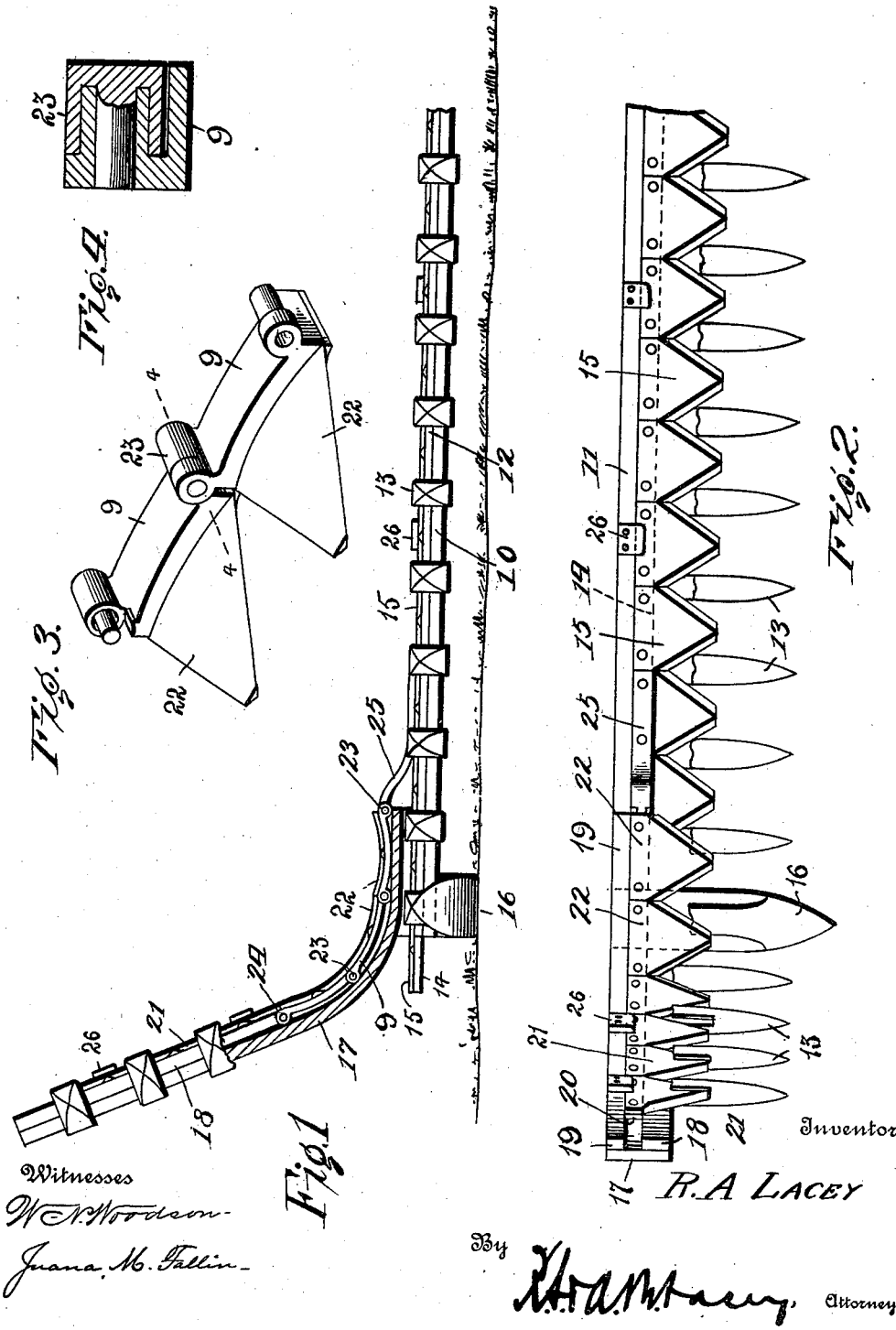

ROBERT A. LACEY, OF BATH, ILLINOIS.

MOWING-MACHINE.

1,002,160. Specification of Letters Patent. Patented Aug. 29, 1911.

Application filed March 24, 1911. Serial No. 616,662.

*To all whom it may concern:*

Be it known that I, ROBERT A. LACEY, citizen of the United States, residing at Bath, in the county of Mason and State of Illinois, have invented certain new and useful Improvements in Mowing-Machines, of which the following is a specification.

This invention relates to improvements in mowing machines, and has for one of its objects to provide a simply constructed device whereby tangled or matted grain and other similar products may be cut without clogging the machine.

Another object of the invention is to provide a device of this character which may be attached without material structural change to different forms of mowing machines and the like.

With these and other objects in view the invention consists in certain novel features of construction as hereinafter shown and described and then specifically pointed out in the claims, and in the drawings illustrative of the preferred embodiment of the invention, Figure 1 is a front elevation of a portion of the cutter bar of a mowing machine with the improvement applied; Fig. 2 is a plan view of the same; Fig. 3 is a perspective view of an enlarged portion of the improved sickle bar detached and inverted; Fig. 4 is an enlarged transverse section on the line 4—4 of Fig. 3.

Corresponding and like parts are referred to in the following description and indicated in all the views of the accompanying drawings by the same reference characters.

The improved device may be applied to any of the various forms and makes of mowing machines, but for the purpose of illustration is shown applied to the sickle bar portion of a mowing machine which comprises a base plate 10, a rear guide 11, the front guide 12, the tooth guards or fingers 13, the sickle abr 14, and the knife sections 15, the latter being riveted or otherwise fastened to the bar 14 and running over the guide 12 with their points within the finger guard. The grain guard or shoe 16 is located at the outer terminal of the sickle bar, and in the improved device a supplemental base plate 17 is employed which is secured to the outer end of the base plate 10 and forms a continuation of the same, and is first curved upwardly for a distance and then extended in an upwardly and outwardly sloping direction, as shown. Connected to the curved and extended plate 17 are two curved members 18—19 corresponding to and forming continuations of the guide members 11 and 12, but above the latter at their inner ends.

Slidably disposed within the straight portion of the extension sickle bar guide 17 is a section of a cutter including a short sickle bar 20 carrying a plurality of cutter sections 21, generally three as shown. Located upon the curved portion of the extension sickle bar guide are a plurality of cutter sections 22 riveted or otherwise secured to the short cutter bar sections 9, the latter being hingedly united to each other, as shown at 23, with the outermost hinged section hingedly united at 24 to the short sickle bar 20 and the innermost hinged sickle section hingedly united to a bracket bar 25, the latter being in turn rigidly secured to the main sickle bar, preferably by employing a number of the rivets by which the main sickle sections 15 are secured. The member 25 is curved upwardly so that the shorter sickle bar device will be arranged movably over the adjacent portion of the main sickle bar. The hingedly united sickle sections are thus caused to move over the curved portion of the extension sickle bar guide and without cramping. The usual guide clips 26 are employed for the cutter bar.

By this arrangement it will be obvious that when the main sickle bar 14 is vibrated by the pitman in the usual manner the supplemental bar will likewise be vibrated but upwardly and outwardly and at an angle to the main sickle bar, and will thus effectually cut the tangled and intertwined grain, hay, pea vines or the like, and will effectually prevent all tendency to clog the cutter bar when operating in products in this condition.

The improved device is simple in construction, can be inexpensively manufactured and applied without material structural changes to sickle bars and sickle bar guides of various forms, and operates effectually for the purposes described.

Having thus described the invention, what is claimed as new is:—

1. An attachment for mowing machines, comprising a supplemental sickle bar guide, means for supporting said supplemental sickle bar guide to form a continuation of the sickle bar guide of a mowing machine, a supplemental sickle bar having sickle sections thereon and movable in the supplemental sickle bar guide, a plurality of sickle sections hingedly united together, means for hingedly uniting one of said hinged sickle sections to said supplemental sickle bar, and means for uniting another of said hinged sickle sections to the sickle bar of a mowing machine.

2. An attachment for mowing machines, comprising a supplemental sickle bar guide, means for supporting said supplemental sickle bar guide to form a continuation to the sickle bar guide of a mowing machine, a plurality of sickle sections hingedly united together, and means for uniting said hinged sickle sections to the sickle bar of a mowing machine.

In testimony whereof, I affix my signature in presence of two witnesses.

ROBERT A. LACEY. [L. S.]

Witnesses:
WILLIAM LACEY,
WARREN BREEDING.

Copies of this patent may be obtained for five cents each, by addressing the "Commissioner of Patents, Washington, D. C."